United States Patent [19]

Erdman et al.

[11] Patent Number: 5,416,115

[45] Date of Patent: May 16, 1995

[54] METHOD FOR REGULATING MILK FAT AND MILK PRODUCTION USING TRANS-FATTY ACIDS

[75] Inventors: Richard A. Erdman, Columbia; Beverly B. Teter, College Park; Mark Keeney, Silver Spring; Joseph Sampugna, University Park, all of Md.

[73] Assignee: University of Maryland, Dept. of Animal Sciences, College Park, Md.

[21] Appl. No.: 110,192

[22] Filed: Aug. 9, 1993

Related U.S. Application Data

[63] Continuation of Ser. No. 901,186, Jun. 19, 1992, abandoned.

[51] Int. Cl.[6] ............... A61K 31/20; A61K 31/225
[52] U.S. Cl. ............... 514/560; 514/547; 514/558
[58] Field of Search ............... 514/558, 560, 547

[56] References Cited

U.S. PATENT DOCUMENTS

| | | | |
|---|---|---|---|
| Re. 31,763 | 12/1984 | Skoch et al. | 426/658 |
| 3,458,625 | 7/1969 | Ensor et al. | 424/523 |
| 4,145,446 | 3/1979 | Kurucz et al. | 426/69 |
| 4,153,735 | 5/1979 | Mommer | 426/285 |
| 4,171,386 | 10/1979 | Skoch et al. | 426/658 |
| 4,311,713 | 1/1982 | Betz et al. | 426/2 |
| 4,388,327 | 6/1983 | Cummins | 426/2 |
| 4,533,557 | 8/1985 | Maruyama et al. | 426/61 |
| 4,642,317 | 2/1987 | Palmquist et al. | 514/558 |
| 4,749,578 | 6/1988 | Benton et al. | 426/74 |
| 4,804,546 | 2/1989 | Sawhill | 426/74 |
| 4,804,547 | 2/1989 | Vanderbilt et al. | 426/69 |
| 4,824,679 | 4/1989 | Freeman | 426/74 |
| 4,826,694 | 5/1989 | McAskie | 426/2 |
| 4,853,233 | 8/1989 | McAskie | 426/74 |
| 4,868,001 | 9/1989 | Maruta | 426/74 |
| 4,911,944 | 3/1990 | Holub | 426/635 |
| 4,919,940 | 4/1990 | Wellons | 426/2 |
| 4,954,363 | 9/1990 | Staker et al. | 426/636 |
| 5,004,728 | 4/1991 | Chalupa et al. | 514/12 |

OTHER PUBLICATIONS

Selner et al. "Effects of feeding oleic acid or hydrogenated vegetable oils to lactating cows." . *J. Dairy Sci*, Aug. 1980 63(8) pp. 1235–1241.

Gaynor et al, abstract presented at American Dairy Science Association, Jul. 21–23, 1991.

Teter et al, abstract, 1989 Annual Meeting ADSA/ASAS.

Teter et al, abstract, Apr. 1987, FASEB.

Sampugna et al, abstract in *Biochem*, vol. 26, No. 13, p. 4167 (1988).

Sampugna et al, abstract at Apr. 22–26, 1990 annual meeting American Oil Chemists' Society.

Teter et al, abstract from *Fed. Proc.* 1989.

Teter et al, abstract from 1989 ASPA/ASAS.

Teter et al, *American Institute of Nutrition*, 1990, vol. 120, pp. 818–829.

Banks et al, *J. Dairy Research*, vol. 51, pp. 387–395, 1989.

Astrup et al, *J. Dairy Research*, vol. 59, No. 3, pp. 426–430, 1975.

Rindsig et al, *J. Dairy Science*, vol. 57, No. 12, pp. 1459–1466, 1974.

Wonsil et al, *FASEB*, 1991, abstract 5427.

*Primary Examiner*—Raymond Henley, III
*Assistant Examiner*—K. Weddington

[57] ABSTRACT

The present invention pertains to reducing milk fat levels optionally to enhancing overall milk yields in ruminants by administration of trans-fatty acids, trans-fatty acid salts, amides, and triglycerides containing trans-fatty acid substituents. The invention also pertains to a method of identifying those trans-fatty acids, trans-fatty acid salts, amides, and triglycerides containing trans-fatty acid substituents which reduce milk fat levels and may also enhance milk yields, and designing ruminant diets containing such trans-fatty acids, salts, or triglycerides.

16 Claims, No Drawings

METHOD FOR REGULATING MILK FAT AND MILK PRODUCTION USING TRANS-FATTY ACIDS

This application is a continuation of application Ser. No. 07/901,186, filed Jun. 19, 1992, now abandoned.

FIELD OF THE INVENTION

The present invention is directed to methods of administering trans-fatty acids and fatty acids resulting from partially hydrogenated oils, salts thereof, amides or triglycerides containing trans-fatty acid substituents to ruminants and other mammals as a means for reducing milk fat concentration and optionally increasing milk production. Heretofore, trans-fatty acids are defined as trans-octadecenoic fatty acids, and triglycerides containing trans-octadecenoic fatty acids and also products resulting from partial chemical hydrogenation of unsaturated fatty acids. In particular, the invention is directed to administering trans-fatty acids, salts thereof, amides or triglycerides containing trans-fatty acids to cows as a means for decreasing milk fat concentrations and optionally increasing milk yields. More particularly, the present invention is directed to methods of administering trans-octadecenoic fatty acids, salts thereof, amides thereof or triglycerides containing said trans-octadecenoic fatty acids to cows as a means for decreasing milk fat concentrations and optionally increasing milk production.

The present invention is further directed to an assay method for identifying those particular trans-fatty acids, salts, amides, or triglycerides containing trans-fatty acids which result in reduction in milk fat concentrations and also the identification of trans-fatty acids, salts, amides, or triglycerides containing trans-fatty acids which further result in increases in milk production in ruminants and other mammals and thereby designing diets containing these trans-fatty acids so as to reduce milk fat concentrations and optionally also enhance milk yields.

BACKGROUND OF THE INVENTION

Optimizing production of human foods is a goal of the food industry since it results in lower production costs and lower cost to the consumer. Accordingly, given the commercial importance of milk products, many methods have been proposed in the art for enhancing milk production by cows. Such methods include, for example, the use of food supplements, breeding programs, drugs, hormones and various food combinations.

One particular means of enhancing milk production by cows which has received fairly recent attention comprises the administration of fatty acids or derivatives thereof, in particular, salts and triglycerides to cows.

For example, U.S. Pat. No. 4,388,327 to Cummins teaches the administration of free fatty acids, specifically gamma-methylmercapto-alpha-hydroxybutyric acid, or its oligomers, to cows as a means for enhancing milk production.

However, fatty acids and, in particular, unsaturated fatty acids, are known to sometimes cause deleterious effects on the cow's ruminant digestive system and digestion. This is believed to be caused by their exerting toxic effects on microbia contained in the rumen which are involved in digestion. Thus, as a means for avoiding this problem, fatty acids have been administered as "rumen inert" forms. These forms include, in particular, salts, including calcium and magnesium salts of fatty acids and cross-linked protein encapsulates containing fatty acids or triglycerides. In this regard, Palmquist et al. (U.S. Pat. No. 4,642,317) teaches the administration of calcium salts of fatty acids containing at least 10 carbon atoms to ruminants as a means for increasing milk production.

As noted, it is known in the art to administer triglycerides of fatty acids to increase milk production in cows. For example, U.S. Pat. No. 4,919,940 issued to Wellons teaches a process for administering triglycerides containing fatty acids with at least 10 carbon atoms in order to enhance milk production.

It is also known in the art to administer fatty acids to increase fat content of milk. For example, U.S. Pat. No. 3,458,625 issued to Ensor et al teaches feeding lactating dairy cows unsaturated fatty acids having 14 to 24 carbon atoms resulting in increased milk production and increased fat content in the milk.

Additionally, U.S. Pat. No. 5,004,728 issued to Chalupa et al. teaches feeding lactating ruminants somatotropin in combination with long chain fatty acids or salts thereof with resulting increased milk production and increased fat content in the milk.

While it may be desirable in some instances to increase the fat content of milk, e.g., if the milk is to be used in the preparation of butter, or other high fat containing milk products it is also desirable to provide methods for the reduction of fat content of milk. This is desirable given the recent consumer demand for low fat milks and other low fat dairy products and the fact that many consumers are on low fat and low cholesterol diets. Because of the natural association of cholesterol with fat in the milk, reducing milk fat will also reduce cholesterol in milk. This is further desirable, since while milk supplies are barely adequate to meet consumer demands, butter (a typical product resulting from milk fat) is the only milk derived commodity which is in surplus and is being stored by the government. Thus, there is not much current market incentive to produce high fat milk products, but rather the current and future incentive is the production of low fat milk. Thus, a safe and inexpensive method which results in production of a natural low fat milk would be highly desirable.

It is known in the art that high levels of grain feeding can lead to milk fat depression in lactating dairy cows and that this depression can be as much as 30 to 40%. Moreover, theories have been advanced as to why high grain diets can result in milk fat depression in lactating cows. These theories include: 1) deficiency of acetate and/or butyrate which is involved in fat synthesis, 2) inhibition of fat synthesis by glucose precursors such as propionate, 3) insulin inhibition caused by propionate or glucose, and 4) deficiency of vitamin $B_{12}$ and other factors which affect liver, mammary and adipose tissue metabolism. However, despite the different theories which have been advanced, dairy scientists are still unaware of the exact mechanism by which a high grain diet reduces milk fat concentrations in lactating cows.

Literature data (Palmquist and Jenkins, *J. Dairy Science*, vol. 63, 1980) shows that unsaturated vegetable fat that is protected from rumen degradation can increase milk fat percent while unprotected vegetable fat or hydrogenated vegetable fat can depress milk fat percent. Rumen microorganisms cause a marked biohydrogenation of unsaturated long chain fatty acids, and this process results in production of trans-octadecenoic acids.

In this regard there have been disclosed in the art various studies correlating milk fat content and relative cis or trans-fatty acid content and distribution in cow's milk. However, none of these studies have established a causative role between the amount and/or type of isomers of fatty acids ingested by cows and resulting milk fat concentrations. Essentially, these studies have merely measured milk fat levels and correlated these levels to the amount and distribution of different fatty acids contained in the milk. Such studies are of course not sufficient to establish any causal relationship between milk fat levels and the ingestion of cis or trans-fatty acids.

For example, Wonsil et al. in Abstract No. 5427 in *FASEB*, abstracted in 1991, teach feeding experiments wherein cows were fed a control diet of supplemental fat, or a diet containing 3% partially hydrogenated fatty acids (46% $C_{16:0}$, 31% $C_{18:0}$, 15% $C_{18:1}$), 1.5% fish oil plus 1.5% stearic acid, or 1.5% soybean oil plus 1.5% partially hydrogenated soybean oil. They observed that the amount of trans 18:1 fatty acids increased when fish oil and soybean oil were fed, and that there was a negative correlation between trans $C_{18:1}$ fatty acids and milk fat percent. However, they recognized no causal relationship between the ingestion of trans-fatty acids and milk fat percent.

A study by Rindsig and Schultz published in *Journal of Dairy Science*, 1980, (57:1459), disclosed experiments wherein lactating Holstein cows were either fed a control diet ration, or the control diet ration in combination with safflower oil or elaidic acid (a trans-fatty acid). They in fact, disclosed that the abomasal infusion of a trans-fatty acid, specifically trans-9-octadecenoic acid failed to depress milk fat percentages. They further noted that there was no discrimination between any particular fatty acid isomer and this reflected an equal susceptibility to lipoprotein lipase of triglycerides containing cis or trans octadecenoic acids. Thus, they also disclosed no causal relationship concerning trans-fatty acid administration to cows and resulting milk fat concentrations.

In a related study by Selner and Schultz published in *Journal of Dairy Science*, 1980 (63: 1253), the co-authors disclose the effect of feeding safflower oil or elaidic acid to lactating cows. They also attempted to establish a causal relationship between trans-fatty acid administration (trans-9-octadecenoic acid) and milk fat levels. They, however, disclosed that this trans-fatty acid did not depress milk fat percentages. Hence, they also found no causal relationship between ingestion of trans-fatty acids and resulting milk fat concentrations.

Finally, in a paper by Banks et at. published in *Journal of Dairy Research*, 1984, (51:387), the authors disclosed the results of feeding experiments relating to different forms of dietary fatty acids and milk fat concentrations and milk yields. In this study cows were fed either a control diet, or saturated fatty acids in three forms, free fatty acids, unprotected triglycerides, or protected triglycerides (triglycerides encapsulated in a cross-linked protein matrix). The authors disclosed that the control diet and the diet containing the free fatty acids produced very little trans-fatty acid isomers in the milk fat, but that the proportions of trans 18:1 fatty acids increased with the diet containing free and protected hydrogenated fatty acids. They further noted that when the protected fat was administered that they observed a slight reduction in milk fat percentages and that this depression may be mediated at the mammary gland level. However, they also did not disclose any causal relationship between trans-fatty acid administration and milk fat percentages.

Thus, none of these studies established any causal relationship between trans-fatty acids and low fat levels in cow's milk, and Rindsig et al and Selner et al in fact even taught against any causal role of trans fatty acids in the reduction of fat levels in cow's milk.

The only study known to the inventors which contains any evidence of a causative relationship between the administration of trans-fatty acids and the reduction of milk fat percentages was effected by three of the present inventors. This study was published in the *Journal of Nutrition*, 1990, (120:818). In this study three of the present co-inventors examined the effects on milk fat percentages in a strain of mice fed a diet containing unsaturated cis-fatty acids, as compared to a diet containing a mixture of cis and trans-fatty acids. The mice which were fed the mixture of cis and trans-fatty acids were found to have reduced milk fat percentages relative to the mice fed only cis-fatty acids. The authors therefore postulated that this decrease was attributable to trans-fatty acids; and that this phenomena may occur in other species, including cows.

However, the experiments reported in this article would, of course, not be viewed as predictive of such a causal relationship in cows given the great dissimilarity of their digestive tracts, most particularly that cows have a ruminant digestive system and mice do not. This difference is particularly noteworthy given the prior recognition in the art that administration of some fatty acids can have adverse effects on the cow's rumen digestive system. In particular, ingestion of free fatty acids may be deleterious to essential digestive microbia contained in the rumen. Accordingly, given the great dissimilarities of a rumen digestive system and a non-rumen digestive system, the experiments conducted by Teter et at. *Journal of Nutrition*, 1990, (120:818), limited to mice are not regarded to be in any way predictive for ruminants, and specifically cows.

Accordingly, prior to the present invention, there existed a great need in the art for a convenient, safe and relatively inexpensive method for reducing milk fat levels. There further existed a need for identifying those trans-fatty acids which when ingested would reduce fat levels and optionally enhance milk yields so that ruminant diets may be designed for the regulation of milk fat content and optionally milk yields.

OBJECTS AND SUMMARY OF THE INVENTION

Surprisingly, the present inventors have now discovered that the administration of trans-fatty acids, salts of trans-fatty acids, amides, or triglycerides containing trans-fatty acid substituents results in both an increase in milk yields and a decrease in milk fat percentages, both of which are highly desirable in the dairy industry.

It is thus a general object of the present invention to provide a novel method for decreasing milk fat percentages in ruminants by the administration of trans-fatty acids, trans-fatty acid salts, amides, or triglycerides containing trans-fatty acid substituents. This method may also result in the enhancement of overall milk yields as well. Although this method should be applicable to mammals, of course the method will most likely be practiced in cows, given the commercial significance of cow's milk products, and in particular low fat milk products produced by cows.

It is another object of the invention to provide a method by which particular trans-fatty acids or derivatives thereof which exert a causative role in reducing fat percentages in milk can be identified. This object is of particular importance since it will enable the design of ruminant diets containing effective amounts of particular fatty acids which exert a causative role in reduction of milk fat levels. Conversely, it will enable the design of animal diets which do not contain amounts of particular trans-fatty acids or precursor products which result in the reduction of milk fat percentages. This would be beneficial, e.g., if the ruminant and non-ruminant animals are to be used in the meat industry wherein maintaining milk fat content at higher levels is desirable since this will result in more efficient weight gain by animals ingesting the milk.

DETAILED DESCRIPTION OF THE PREFERRED EMBODIMENTS OF THE INVENTION

Prior to discussing the invention in more detail, the following definitions are provided so that the meaning of the invention will be clearly understood by those skilled in the art.

"Fatty acid" is a carboxylic acid derived from or contained in an animal or vegetable fat or oil. Fatty acids are composed of a chain of alkyl groups containing 4 to 22 carbon atoms (usually even numbered) and have a terminal COOH group. The generic formula is $CH_3—(CH_2)_x—COOH$. Fatty acids are either saturated or unsaturated.

"Saturated fatty acid" is a fatty acid in which all the carbon atoms of the alkyl chain are connected by single bonds.

"Unsaturated fatty acid" is a fatty acid in which there are one or more double bonds between the carbon atoms in the alkyl chain.

"Triglyceride" is an ester of three fatty acids and glycerol. They have the general formula $CH_2—(OOCR_1)—CH—(OOCR_2)—CH_2—(OOCR_3)$, where $R_1$, $R_2$, and $R_3$ are hydrocarbon groups of the same or different chain length.

"Cis-fatty acid" is an isomer of a fatty acid containing at least one double bond between carbon atoms which prevents free rotation and which has the following spatial arrangement relative to the carbon-carbon double bond:

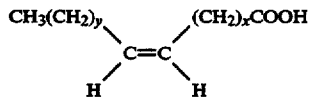

wherein x and y are each whole numbers and may be 0, and with the proviso that their selection results in a fatty acid having the above-recited generic formula.

"Trans-fatty acid" is an isomer of a fatty acid containing at least one double bond between the carbon atoms which prevents free rotation and which has the following spatial arrangement relative to the carbon-carbon double bond:

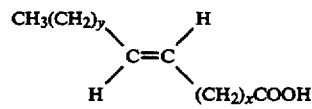

wherein x and y are each whole numbers and may be 0, with the proviso that their selection results in a fatty acid having the above-recited generic formula.

"Rumen insoluble or inert fatty acid salts" are salts which are less soluble in the rumen than the corresponding free fatty acid.

"Protected" forms of fatty acids or triglycerides are compositions comprising fatty acid or triglycerides which render the fatty acid or triglyceride less susceptible to the effects of rumen fermentation, than the free forms of the fatty acid or triglyceride. These "protected fatty acids" or "triglycerides" include, in particular, cross-linked protein encapsulates containing fatty acids or triglycerides and fatty acid triglyceride compositions wherein the fatty acid or triglyceride is coated by saturated fats of high melting point. Fats can also be protected inside food particles such as corn, soybeans, etc. Naturally protected multivalent salts of fatty acids such as magnesium salts of fatty acids could be considered protected since they are unavailable to rumen microorganisms.

As noted above, the present invention is directed to a method for administering trans-fatty acids, trans-fatty acid salts, amides, or triglycerides containing trans-fatty acid substituents, or a combination thereof, to ruminants in order to reduce milk fat levels and optionally to also enhance milk yields. Moreover, the present invention is directed to a method for identifying those trans-fatty acids, triglycerides containing trans-fatty acid substituents, or trans-fatty acid salts, amides and triglycerides which result in reduced fat levels when these fatty acids, triglycerides, or salts are administered to ruminants.

In a preferred embodiment, the animals which are treated will comprise cows. However, the present process should be applicable to all mammals. In a preferred embodiment the trans-fatty acids, trans-fatty acid salts, amides, or triglycerides containing trans-fatty substituents will comprise trans-octadecenoic acids, trans-octadecenoic salts, amides, or triglycerides containing trans-octadec, enoic acid substituents which when administered to ruminants result in a reduction of milk fat levels and may also result in an increase in milk yields. However, it is expected that the present method may be applicable to other trans-fatty acids, trans-fatty acid salts, amides, or unusual cis isomers resulting from biohydrogenation or triglycerides containing cis- or trans-fatty acid substituents as well. Accordingly, any trans-fatty acid, trans-fatty acid salt, amide, or triglyceride containing trans-fatty acid substituents, or intermediate products resulting from the biohydrogenation process in the production of trans-fatty acids, or any combination thereof which causes milk fat levels to decrease when this trans-fatty acid, salt, amide, or triglyceride, or combination thereof is administered to a ruminant animal in an effective amount is intended to be within the scope of the present invention.

Examples of specific trans-fatty acids, salts, amides, or triglycerides which be useful in the present invention include calcium, magnesium, cobalt, ammonium, strontium or multivalent salts of trans $18:1(\Delta3–\Delta16)$, $18:2$ cis-trans, trans-cis or trans-trans and conjugated 18:2 fatty acids and any triglyceride containing one or more of the above fatty acids or unnatural cis isomers found in partially hydrogenated fats and oils or those trans-fatty acids, salts, amides, or triglycerides which may be produced during the biohydrogenation process in the rumen.

When administering the trans-fatty acids, trans-fatty acid salts, amides, and triglycerides to ruminants, the preferred means of administration will comprise providing the trans-fatty acids, trans-fatty acid salts, amides, and triglycerides containing trans-fatty acid substituents, or a combination thereof as food supplements. This method of administration is advantageous since it is safe, efficient, and inexpensive and further enables a number of ruminants to be treated at once. However, other methods of administration would be suitable as well including, e.g., postruminal infusion, intramammary injections, and intravenous injections.

The trans-fatty acid, trans-fatty acid salt, amide, or triglyceride may be administered by itself, in a rumen protected form, or as part of the food ration. When administering free fatty acids it may be desirable to administer these materials in a form which is rumen inert or rumen insoluble. For example, it may be desirable to encapsulate the free fatty acid in a protective matrix, such as, a cross-linked protein matrix that is comprised of proteins which are nutritionally safe or to coat the free fatty acid with a saturated high melting point fat. Methods for providing fatty acids as rumen inert or insoluble forms are generally known in the art and are taught, e.g., in the Banks et at. article and the Wellons and Palmquist patents, which references are discussed in the background of the invention and are hereby incorporated by reference in their entirety.

When administering the trans-fatty acids, trans-fatty acid salts, amides, and triglycerides containing trans-fatty acid substituents it is preferable to administer these materials constantly throughout the entire lactation period, preferably as food supplements. This will enable the optimal enhancement of milk yields and reduction of milk fat levels. However, it is not necessary to administer these materials throughout the entire lactation period and the exact length of the treatment may be varied so as to obtain the desired reduction of milk fat and enhancement of milk yields. This duration will further depend upon the cost benefit analysis of the treatments and the desired level of milk fat reduction, and the dose response.

The actual amount of trans-fatty acids, trans-fatty acid salts, amides, and triglycerides, or combinations thereof will vary depending upon factors including the particular trans-fatty acid, trans-fatty acid salt, amides, and triglyceride containing trans-fatty acid substituents, and whether or not it is administered in a protected form, the particular animal treated, the particular mode of administration, diet of the animal, and the cost effectiveness of the treatment.

A determination of particular dosage effective amounts are well within the level of ordinary skill in the art and may be determined, e.g., by administering various amounts and/or dosage forms of different trans-fatty acids, trans-fatty acid salts, amides, and triglycerides containing trans-fatty acids, or combinations thereof and ascertaining which dosage formulation and dosage regimens result in the optimal reduction of milk fat levels and optionally also enhance milk yields while still being cost effective.

For example, when administering trans-octadecenoic acids a preferred dosage amount ranges from 50 to 400 g/d and preferably 2-4 times daily and for as long as the depression in milk fat is desired. This dosage is effective within 2-4 days while residual responses after treatment is discontinued lasts only 2-4 days.

However, of course, these dosage amounts, dosage formulations, and length of treatment will vary dependent upon the particular trans-octadecenoic acid(s) utilized whether the trans-fatty acid(s) is in the form of a salt, amide, or a triglyceride, whether it is in free form or contained in a protein encapsulate or coated with a saturated high melting point fat, and the cost effectiveness of the treatment. As noted above, one skilled in the art can vary the amount by trial and error so as to achieve the desired level of milk fat reduction and possibly milk yield enhancement.

As discussed above, an additional object of the present invention comprises the identification of those trans-fatty acids, trans-fatty acid salts, amides, and triglycerides, or combinations thereof, which result in a reduction of milk fat levels when these materials are administered to ruminants, in particular cows. Additionally, once these efficacious trans-fatty acids, trans-fatty acid salts, amides, and triglycerides are identified as described hereafter, a further object of the invention is to formulate ruminant diets which provide for regulation of milk fat levels and may also increase relative milk yields.

This method of identification may be effected as follows in a variety of ways including the following:

A first control feed formulation and a second experimental feed formulation will be made. These feed formulations will be identical, except that the first formulation will contain only the cis-form (naturally occurring oleic acid) of a particular fatty acid, fatty acid salt, amide, or triglyceride containing the cis-form of a fatty acid, and the second formulation will contain an identical amount of the corresponding trans-fatty acid (produced either by chemical or bio-hydrogenation), salt, amide, or triglyceride, and no cis-fatty acid, or an amount of the cis and trans-fatty acid such that the total amount of cis and trans-fatty acids equals the amount of cis only in the control feed formulation. Then a first group of ruminants, e.g., cows, will be administered the control formulation and a second group of ruminants, e.g., cows, will be fed the second (experimental) formulation.

The two groups of animals should be as nearly identical as possible so that it can be established that any observed differences in milk fat or milk yields are attributable to the particular trans-fatty acids administered. For example, the animals should be about the same age, weight, and be at about the same point in the lactation cycle.

The animals in both groups will, of course, be administered equal amounts of these formulations for the same dosage period and as noted will preferably be treated at the same point in the lactation cycle so as to eliminate any aberrations attributable, e.g., to hormonal levels which may vary throughout lactation and could also affect milk fat percentages or milk yield or normally observed changes in milk yield and milk composition during the lactation cycle.

During the treatment period, the quantity of milk and its milk fat composition will be measured for both groups at particular intervals throughout the treatment period. Preferably milk yield and milk composition will be quantified daily.

Those fatty acids, triglycerides, amides, or salts which when these values are compared for both groups are observed to result in a statistically significant increase of milk yield and decrease of milk fat levels will be determined to be efficacious for use in the reduction of milk fat and enhancement of milk yields in ruminants (cows).

After such efficacious trans-fatty acids, salts, amides, or triglycerides have been identified, they will be used as ruminant food supplements or for post-ruminal infusion. It may also be desirable to administer such trans-fatty acids, trans-fatty acid salts, amides, and triglycerides in combination since they may act synergistically in the reduction of milk fat levels and enhancement of milk yields. This will be determined by administering various combinations of partially hydrogenated fats containing trans-fatty acids, trans-fatty acid salts, amides, and triglycerides containing trans-fatty acid substituents, and measuring their overall effects on milk fat and milk yields. Thus, it should be possible to design a ruminant or for that matter any mammal diet which predominantly contains an array of trans-fatty acids, salts, amides, or triglycerides which result in the reduction of milk fat and possibly also an enhancement of milk yield.

Conversely, it will be possible to design ruminant diets which do not contain such trans-fatty acids, or which do not contain such trans-fatty acids salts, amides, or triglycerides in significant amounts. This will be particularly beneficial when the ruminant is being used in the meat industry when it is desirable to maintain milk fat percentages at higher levels since this results in a more efficient weight gain by animals consuming the milk.

In order to further illustrate the present invention and the advantages thereof, particularly in the reduction of milk fat levels and the enhancement of milk yields in cows, the following specific example is given, it being understood that the same is intended to be only illustrative and in no way limitative.

EXAMPLE

Five rumen fistulated Holstein cows (4 cows, 230 days postpartum; and one early lactation cow, 44 days postpartum) were studied in this experiment. These cows were all fed a diet consisting of 50% forage (25% corn silage, 25% alfalfa haylage, DM basis) and 50% concentrate during the entire study. The diets were formulated to meet National Research Council nutritional requirements. The exact composition of the diet is depicted in Table 1. Cows were fed this experimental diet for two weeks prior to the start of postruminal infusions.

TABLE 1

| Ingredient | Total Mixed Diet (% of Diet DM) | Grain Mix % As Fed | lb/Ton |
|---|---|---|---|
| Corn silage | 25 | | |
| Alfalfa Haylage | 25 | | |
| Barley | 10 | 19.93 | 399 |
| Corn | 27.88 | 56.85 | 1137 |
| Soybean meal (49% crude protein) | 10.10 | 19.68 | 393 |
| Trace mineral salt | .50 | .87 | 17 |
| Vitamin ADE | .025 | .044 | 1 |
| Limestone | .40 | .70 | 14 |
| Dicalcium Phosphate | .90 | 1.58 | 32 |

TABLE 1-continued

| Diet Ingredient and Chemical Composotion | | | |
|---|---|---|---|
| Dynamate | .20 | .35 | 7 |
| TOTAL | 100.00 | 100.00 | 2000 |

| Estimated Chemical composition Concentration (Total diet, DM basis) | |
|---|---|
| NE (Mcal/kg) | 1.65 |
| Protein % | 16.60 |
| Rumen degraded protein % | 10.31 |
| Rumen undegraded protein % | 6.29 |
| Calcium % | .80 |
| Phosphorous % | .50 |
| Magnesium % | .22 |
| Sulfur % | .23 |
| Potassium % | 1.25 |
| Acid detergent fiber % | 19.0 |
| Neutral detergent fiber % | 27.1 |
| Ether Extract % | 3.1 |

On day one of the infusion period, the cows were each fitted with abomasal tubing using standard techniques in the art. (Sharma et al, 1989, J. Nutr. (19:248)). The tubing, once passed through the rumen canula, was secured and used as a port for postruminal infusion of a triglyceride mixture containing either 63% total 18:1 fatty acid and 46% 18:1 trans-fatty acid by weight or an identical blend lacking any 18:1 trans-fatty acid and containing substantially about 63% total 18:1 cis fatty acid. The exact composition of the two fatty acid mixtures is shown in Table 2.

TABLE 2

| Fatty Acid Mixtures and Composition | | |
|---|---|---|
| Source | Trans | Cis (Control) |
| Corn Oil | 7 | |
| Shortening Stock | 93 | |
| Cocoa Butter | | 35 |
| High oleic sunflower oil | | 65 |

| Composition (No. of carbons:double bonds) | | |
|---|---|---|
| 12:0 | .08 | .04 |
| 14:0 | .37 | .07 |
| 14:1 | .00 | .00 |
| 15:0 | .46 | .01 |
| 16:0 | 13.26 | 12.06 |
| 16:1 | .19 | .16 |
| 17:0 | .28 | .09 |
| 18:0 | 16.16 | 15.18 |
| 18:1 cis | 16.52 | 62.88 |
| 18:1 trans | 45.94 | .13 |
| Total 18:1 | 62.46 | 63.01 |
| 18:2 | 6.33 | 7.36 |
| 20:0 | .40 | .71 |
| Total Saturates | 31.12 | 29.11 |
| Total Monounsaturates | 62.67 | 63.39 |
| Total Polyunsaturates | 6.39 | 7.48 |

The infusion periods lasted two weeks with treatment assignments being shown in Table 3. Milk sampling problems with milk meters in Period 1, resulted in widely fluctuating milk fat percents. Therefore, Period 2 treatment assignments were repeated after Period 3 during the experiment. The infusion mixtures were infused at the rate of 600 ml/d. Fats (4×50 cc syringes) were infused three times daily at 0600, 1300 and 2000 hours. The fats were prewarmed to 50° C. using an oven incubator since the melting points of these blends are above ambient temperature.

TABLE 3

Sampling Timetable

| Period | Diet | Cow No. 1 | 2 | 3 | 4 | 5 | Days | Milk[2] |
|---|---|---|---|---|---|---|---|---|
| 1 | Diet only | | | | | | 7 | X |
|   | Infusion oil[1] | | | | | | 11–14 | X |
| 2 |  | T | T | T | C | C | 21 | X |
|   |  |   |   |   |   |   | 25–28 | X |
| 3 |  | C | C | C | T | T | 35 | X |
|   |  |   |   |   |   |   | 39–42 | X |
| 4 |  | T | T | T | C | C | 49 | X |
|   |  |   |   |   |   |   | 53–56 | X |
| 5 | Diet only | | | | | | 63 | X |
|   |  |   |   |   |   |   | 67–70 | X |

[1]T = trans, C = cis or control
[2]Milk samples from individual milkings were retained, cooled at 5° C. and submitted for fat, protein and lactose analysis. The samples for fatty acid composition were pooled samples from days 11–14 at the end of each experimental period. Samples for fat % and protein % were analyzed fresh for each sample. Samples for fatty acid composition of milk were pooled by days 11–14, 25–28, 39–42, 53–56, 67–70.

Milk samples from individual milkings were taken on days 7 and 11–14 during the preliminary period; each of the experimental periods, and the post experimental period. Samples within individual cows were composited for future analysis of fatty acid composition while fat and protein analysis were determined on individual samples at the Environmental System Services Laboratories (College Park, Md.) by infrared procedures.

Cows were individually fed the diets shown in Table 1 twice daily, and feed refusals were recorded once daily. Bodyweights were recorded weekly. Dry matter analyses were done weekly while composite samples for the entire experiment were for nutrient composition and fatty acid analysis.

The data was statistically analyzed by analysis of variance in the General Linear Methods Procedure of the Statistical Analysis System using the model: Y = Fat Source + Period + Cow; where individual cow within period was the experimental unit.

The results of the experiment are shown in Table 4 which depicts milk yield and composition data for cis vs. trans infusions. The results show that the infusion of trans 18:1 fatty acid reduced milk fat percent by 0.93 percentage points (P<0.09). The responses showed some variability, however the magnitude of the response demonstrates the clear potential of trans-fatty acids for regulating milk fat synthesis. The milk yield was increased (P<0.03) 2.3 kg/d for trans vs. cis fatty acid infusion. Accordingly, even though trans-fatty acid infusion reduced milk fat percent, the excess energy was repartitioned toward added milk volume.

Milk protein and lactose percent tended to be somewhat lower with trans vs. cis infusion although the differences were not significant. However, milk lactose yield was 74 g/day higher (P<0.02) because of increased milk volume (Table 4) due to trans vs. cis fatty acid infusion. Fat corrected milk yield was not affected by infusion treatment.

TABLE 4

Effect of Control Versus Trans Fat Infusion on Milk Yield, Feed Intake and Composition

| Item | Cis | Trans | SE[a] | P<[c] |
|---|---|---|---|---|
| Feed intake[b], kg/d | 22.0 | 21.9 | .6 | .72 |
| Milk |  |  |  |  |
| Kg/d | 27.0 | 29.3 | .5 | .03 |
| Fat, % | 4.51 | 3.58 | .32 | .09 |
| Protein, % | 3.28 | 3.21 | .02 | .12 |
| Lactose, % | 4.77 | 4.67 | .07 | .35 |
| Fat yield, g/d | 1229 | 1126 | 122 | .59 |
| Protein, yield, g/d | 879 | 933 | 18 | .12 |
| Lactose, yield, g/d | 1297 | 1371 | 10 | .02 |
| 3.5% fat corrected milk, kg/d | 31.6 | 30.9 | 2.1 | .88 |

[a]Standard error of mean.
[b]Estimated dry matter intake.
[c]Probability that treatment effects are not different.

Although statistical analysis could not be made with noninfused animals in the pre and post experimental periods because of known effects of lactation stage on milk yield and composition, the average fat and protein percent was 5.10 and 3.23 respectively for the pre and post infusion periods. This further shows that infusion of trans 18:1 fatty acids reduces milk fat percent when compared to a noninfused control. Moreover, the treatment method had no effect on the amount of milk protein. Thus, it should be possible with the present invention to avoid the reduction in milk protein that has been previously observed with fat feeding or infusion. Thus, the results of this experiment clearly show the potential of trans 18:1 fatty acids in regulating milk fat content and milk yields. Although the effects of only trans 18:1 fatty acids vs. cis 18:1 fatty acids were particularly studied, it is expected that possibly other trans-fatty acids will exert similar effect in reducing milk fat levels while still maintaining or even enhancing milk yields.

Accordingly, administration of trans-fatty acids, and in particular trans-octadecenoic (18:1) fatty acids, or salts or triglycerides thereof in protected or unprotected forms will be useful in the regulation of milk fat levels and also in the enhancement of milk yields in ruminants; most particularly cows.

Moreover, identification of particular trans-fatty acids which exert a causative rule in regulating fat concentrations will enable the design of diets which provide for either enhancement or reduction of fat levels as desired.

Although the invention has been described with preferred embodiments, it is to be understood that variations and modifications may be used as will be appreciated by those skilled in the art. Such variations are to be considered within the scope of the following claims.

What is claimed:

1. A method for the reduction of milk fat levels in a ruminant comprising administering to a ruminant at least one rumen insoluble or protected form of a trans-fatty acid isomer species, trans-fatty acid salt, amide, or a triglyceride containing trans-fatty acid substituent in an effective amount and for a sufficient time to reduce milk fat levels.

2. The method of claim 1 wherein the ruminant is a cow.

3. The method of claim 1 wherein the method comprises administration of a protected or rumen insoluble form of trans-octadecenoic fatty acids.

4. The method of claim 1 wherein the method comprises administration of a rumen insoluble salt of trans-octadecenoic acid.

5. The method of claim 4 wherein the salt comprises a calcium or magnesium salt or other multivalent cation.

6. The method of claim 1 wherein the method comprises administration of a rumen insoluble or a protected trans 18:1 fatty acid.

7. The method of claim 1 wherein the protected form comprises a cross-linked protein matrix containing the rumen insoluble or protected trans-fatty acid or a protective coating of saturated high melting point fat containing the trans-fatty acid.

8. The method of claim 1 wherein the method of administration comprises providing the trans-fatty acid, trans-fatty acid salt, amide, or triglyceride containing trans-fatty acid acyl group substituents as a feed supplement.

9. The method of claim 1 wherein the rumen insoluble or protected trans-fatty acid, trans-fatty acid salt, amide, or triglyceride containing trans-fatty acid substituents is administered by postruminal infusion.

10. The method of claim 1, wherein the administration of the rumen insoluble or protected trans-fatty acid, trans-fatty acid salt, or triglyceride containing trans-fatty acid substitutents further results in the enhancement of milk yield.

11. A method for identifying those trans-fatty acids which reduce milk fat percentages when administered to ruminants which method comprises:
   (1) administering to a first group of lactating ruminants for a particular time interval and in a particular amount a control diet which contains only the rumen insoluble or protected cis-form of a particular fatty acid;
   (2) administering to a second group of lactating ruminants for the same time interval and in the same amount a second diet formulation which is identical to the first diet formulation except that it contains the corresponding trans-fatty acid in a rumen insoluble or protected form and either does not contain the cis-fatty acid or comprises the cis fatty acid such that the total amount of cis and trans-fatty acid are the same as the amount of cis-fatty acid in the first diet formulation;
   (3) periodically measuring milk fat percentages and milk yields in both groups of ruminants;
   (4) comparing the milk fat percentages in both groups of ruminants; and
   (5) identifying those trans-fatty acids which result in statistically significant decreases in milk fat percentages.

12. The method of claim 11, wherein the milk yields in both groups of ruminants are also compared and trans-fatty acids are selected on the basis of those which result in both statistically significant decreases in milk fat and statistically significant increases in milk yield.

13. A method for the reduction of milk fat levels in a ruminant comprising administering 50 to 400 grams/day of at least one rumen insoluble or protected form of a trans-fatty acid isomer species, trans-fatty acid salt, amide or triglyceride containing trans-fatty acid substituents.

14. The method of claim 13, wherein the trans-fatty acid comprises a trans-octadecanoic acid.

15. The method of claim 13, wherein administration is effected 2 to 4 times daily for as long as milk fat depression is desired.

16. The method of claim 13, wherein the ruminant comprises a cow.

* * * * *